United States Patent Office 3,600,469
Patented Aug. 17, 1971

3,600,469
**COATING COMPOSITIONS OF CHLOROSULFO-
NATED POLYETHYLENE AND CHLORINATED
ISOTACTIC POLYPROPYLENE**
Koichi Sato, Suita-shi, Akira Niki, Hirakata-shi, and
Masanobu Morimoto, Ibaragi-shi, Japan, assignors to
Asahi Kasei Kogyo Kabushiki Kaisha, Osaka, Japan
No Drawing. Filed Feb. 18, 1969, Ser. No. 800,295
Claims priority, application Japan, Feb. 23, 1968,
43/11,092
Int. Cl. C08f 29/12, 29/22
U.S. Cl. 260—897C
3 Claims

ABSTRACT OF THE DISCLOSURE

A coating composition capable of affording a coating film having an improved surface adhesive property, comprising 100 parts by weight of a vulcanizable noncrystalline chlorosulfonated polyethylene, 15-45 parts by weight of tribasic lead maleate, 5-50 parts by weight of chlorinated isotactic polypropylene and, optionally, organic acids and vulcanization accelerators.

BACKGROUND OF THE INVENTION (1) Field of the invention

This invention relates to coating compositions.

(2) Description of the prior art

In general, a coating film having good water resistance, color stability, abrasive resistance, weatherability and flexive or bending resistance may be obtained by sufficiently vulcanizing chlorosulfonated polyethylene synthetic rubbers using a vulcanizing agent containing tribasic lead maleate.

However, the coating film has a drawback in that when other adhesives or paints are further applied thereon, the films of adhesives or paints tend to be peeled off or vulnerable during actual use thereof, due to the fact that the surface of the coating film lacks an actinity which provides a sufficient adhesive strength between those adhesives or paints applied and the coating film.

In order to improve the adhesiveness of a coating film with adhesives or paints, in general, there have been adopted such methods as subjecting a surface of a sufficiently chlorosulfonated polyethylene coating film to chemical treatments using oxidizers, or, alternatively, to an elaborate washing treatment with solvents. However, these methods practised heretofore are of less utility, considering the troublesome operations involved and economy. Alternatively, there may be contemplated the use of chlorosulfonated polyethylene coating film with insufficient vulcanization for achieving the same object, but, this also is undesirable since the excellent properties of vulcanized chlorosulfonated polyethylene coating film are drastically deteriorated by the insufficient vulcanization.

In vulcanizing chlorosulfonated polyethylene synthetic rubbers, there may be used vulcanizing agents such as magnesium oxide, organic amines, epoxy resins, etc., other than the tribasic lead maleate mentioned above.

White vulcanized coating film afforded by using vulcanizing agents mentioned above excluding tribasic lead maleate show somewhat better adhesiveness with adhesives and paints as compared with those of coating films vulcanized using tribasic lead maleate, on the other hand, there is exposed a drawback in that their physical properties such as abrasive resistance and flexive resistance are considerably deteriorated.

There are also concurred drawbacks in that vulcanized coating films, in particular those vulcanized using magnesium oxide, have poor water resistances, that those vulcanized using epoxy resins and organic amines have undesirable surface stickiness and that particularly when organic amines are incorporated, the stability of a mixed composition solution tends to be drastically degraded. Furthermore, vulcanized coating films vulcanized using lead oxide, which is another vulcanizing agent commonly used, have a drawback in that, inter alia, there is obtained no clear colored coating films, though coating films thus vulcanized have physical properties comparable to those of coating films vulcanized using tribasic lead maleate.

SUMMARY OF THE INVENTION

It is, therefore, an object of this invention to provide a coating composition comprising a chlorosulfonated polyethylene and tribasic lead maleate capable of affording a vulcanized coating film having a greatly improved adhesiveness with adhesives and paints applied thereon without deteriorating excellent physical properties inherent to a chlorosulfonated polyethylene sufficiently vulcanized.

In vulcanizing a vulcanizable non-crystalline chlorosulfonated polyethylene (hereinafter referred to simply as "chlorosulfonated polyethylene") by polybasic metal salts of weak acids, the present inventors have found that there is obtained a vulcanized coating film preserving excellent water resistance, color stability, abrasive resistance, weatherability, flexive or bending resistance which are inherent desirable properties of a sufficiently vulcanized chlorosulfonated polyethylene synthetic rubber, as well as having an improved surface adhesive property affording an increased adhesiveness between the surface thereof and adhesives and paints coated or overlaid thereon, by subjecting a composition comprising 100 parts by weight of chlorosulfonated polyethylene, 15-45 parts by weight of tribasic lead maleate, 5-50 parts by weight of post-chlorinated isotactic polypropylene, preferably being obtained by chlorinating an isotactic polypropylene having a molecular weight ranging from 50,000 to 200,000 and an isotacticity of 50-90%, i.e. containing 50-90% n-heptane insoluble portion, until the resulting chlorinated polypropylene has 20-40% chlorine content, and optionally organic acids, vulcanization accelerators and pigments to vulcanization reaction.

This invention relates to a coating composition affording such vulcanized coating film as described above.

Chlorosulfonated polyethylenes which may be used for the coating composition of this invention are generally known as Hypalon 20, 30 and 40 (registered trademark of E.I. du pont de Nemours & Co., U.S.A.). For example, Hypalon 20 has a molecular weight of about 20,000, a 29-35% chlorine content and less than 1% sulfur content.

Post-chlorinated isotactic polypropylenes which may be used for the coating composition of this invention are required to have a compatibility with chlorosulfonated polyethylene referred to above as well as a capability of affording a vulcanized coating film therefrom having physical properties comparable to those of a vulcanized coating film obtained from chlorosulfonated polyethylene alone.

In order to obtain a coating film having satisfactory surface adhesive property as described above, there is used a post-chlorinated polypropylene obtained by chlorinating an isotactic polypropylene having a molecular weight ranging from 50,000 to 200,000 to have 20–40% chlorine content. If the chlorine content is less than 20%, not only is the solubility of the post-chlorinated isotactic polypropylene in the solvent decreased but also the surface adhesive property of the resulting vulcanized coating film may not be satisfactorily improved, while the chlorine content exceeding 40% leads to a drawback in that physical properties of the resulting vulcanized coating film obtained therefrom are degraded as compared with those of a vulcanized coating film obtained from a chlorosulfonated polyethylene alone.

Solvents which may be used for dissolving the post-chlorinated isotactic polypropylenes in this invention include chlorinated products of aliphatic hydrocarbons, e.g. tetrachloroethane and carbon tetrachloride. On the other hand, these solutions are compatible with solvents such as aromatic hydrocarbons, e.g. toluene and xylene, ketones and esters, which are typical and general solvents for chlorosulfonated polyethylenes. Thus, in mixing respective components, conventional methods of mixing chlorosulfonated polyethylene and tribasic lead maleate vulcanizer may be conveniently followed.

In preparing a solution of the present composition, first chlorosulfonated polyethylene, tribasic lead maleate, post-chlorinated isotactic polypropylene and other organic acids, vulcanization accelerators and pigments are uniformly mixed by using a general mixer, roller mixers, etc. then, to the resulting mixture is suitably added a solvent to render the mixture a viscosity suitable for coating operation.

Organic acids which may be used for the coating composition of this invention include stearic acid, adipic acid, phthalic acid, maleic acid, citric acid and anthranilic acid.

Vulcanization accelerators which may be used for the coating composition of this invention include tetraethylthiuram disulfide, tetramethylthiuram disulfide, dipentamethylenethiuram tetrasulfide, 2-mercaptoimidazoline, benzothiazyl disulfide and diorthotolylguanidine.

The solution of vulcanizable coating composition thus prepared is applied on surfaces of cloth substrates comprising fibrous materials, synthetic resins, wood or metals and, after the solvent is evaporated, a heat treatment is carried out to obtain a sufficiently vulcanized coating film.

The vulcanized coating film thus obtained has a greatly improved adhesive strength between the surface thereof and adhesives and paints applied thereon while showing various performances comparable to those of a vulcanized coating film obtained from chlorosulfonated polyethylene alone and affords quite satisfactory results in actual use.

Adhesives referred to in this invention are generally known adhesives mainly comprising synthetic rubbers such as chlorosulfonated polyethylene and neoprene, natural rubber, polyurethane, polyepoxy polyamide resins and vinyl chloride-vinyl acetate or ethylene-vinyl acetate copolymer resins. Paints referred to in this invention are those obtained by coloring the adhesives mentioned above and, sometimes, adding 1–10% by weight of oil-soluble water repellants such as silicone resin, paraffin and higher fatty acid.

DESCRIPTION OF THE PREFERRED EMBODIMENTS

The following examples will serve to illustrate this invention more practically. However, it should not be construed that these examples will restrict this invention in any manner.

EXAMPLES 1–6

There were prepared coating compositions by incorporating chlorosulfonated polyethylene (Hypalon 20, trade name), tribasic lead maleate and various types and amounts of other ingredients as specified in the following Table 1 into various amounts of post-chlorinated isotactic polypropylene obtained by chlorinating an isotactic polypropylene having a molecular weight of 80,000 to have 35% chlorine content and mixing the ingredients by using a roller mixer.

The resulting coating compositions were applied on glass plates according to film casting method by knife, respectively, to form a coating film of 0.3 mm. thickness which was heat treated at 100° C. for 5 minutes and further at 160° C. for 10 minutes to give a vulcanized coating film.

The resulting vulcanized films were evaluated, respectively, with regard to 100% modulus, swelling degree for water which is determined by measuring rate of weight increase after immersing samples for 7 days in water for evaluating the water resistance, and discoloration.

TABLE 1

|  | Comparative experiments |  |  |  |  | Examples |  |  |  |  |  |
|---|---|---|---|---|---|---|---|---|---|---|---|
|  | 1 | 2 | 3 | 4 | 5 | 1 | 2 | 3 | 4 | 5 | 6 |
| Ingredients for coating composition (parts by weight): |  |  |  |  |  |  |  |  |  |  |  |
| Hypalon 20 | 100 | 100 | 100 | 100 | 100 | 100 | 100 | 100 | 100 | 100 | 100 |
| Tribasic lead maleate | 40 |  |  |  |  | 40 | 40 | 40 | 40 | 40 | 40 |
| Lead oxide |  | 25 |  |  |  |  |  |  |  |  |  |
| Magnesium oxide |  |  | 20 |  |  |  |  |  |  |  |  |
| Uncured epoxy resin [1] |  |  |  | 20 |  |  |  |  |  |  |  |
| Organic amine [2] |  |  |  |  | 20 |  |  |  |  |  |  |
| Hydrogenated wood rosin | 2 | 2 | 2 | 2 |  | 2 | 2 | 2 | 2 | 2 | 2 |
| Stearic acid | 0.5 | 0.5 | 0.5 | 0.5 | 0.5 | 0.5 | 0.5 | 0.5 | 0.5 | 0.5 | 0.5 |
| 2-mercaptoimidazoline | 2 | 2 | 2 | 2 | 2 | 2 | 2 | 2 | 2 | 2 | 2 |
| Post-chlorinated isotactic polypropylene |  |  |  |  |  | 5 | 10 | 25 | 40 | 50 | 70 |
| Toluene | 300 | 300 | 300 | 300 | 300 | 300 | 300 | 300 | 300 | 300 | 300 |
| Properties of vulcanized coating film: |  |  |  |  |  |  |  |  |  |  |  |
| 100% modulus (kg./cm.²) | 55.0 | 55.4 | 41.0 | 23.3 | 15.2 | 56.1 | 54.8 | 55.2 | 53.6 | 50.5 | 32.0 |
| Swelling degree for water (percent) | 6.7 | 6.8 | 34.0 | 12.0 | 18.2 | 6.5 | 6.2 | 6.4 | 6.3 | 6.5 | 6.4 |
| Discoloration | Nil | [3] | Nil | Nil | [4] | Nil | Nil | Nil | Nil | Nil | Nil |

[1] Epikote 828, product of Shell (U.S.A.).
[2] Metaphenylenediamine.
[3] Discolored to dark brown.
[4] Discolored to yellow.

As is clear from Table 1, vulcanized coating films obtained by using tribasic lead maleate vulcanizer show excellent overall physical properties as compared with those obtained by using other vulcanizers.

It can also be noted therefrom that vulcanized coating films incorporated with post-chlorinated isotactic polypolypropylene obtained by using tribasic lead maleate vulcanizer show physical properties comparable to those of a vulcanized coating film obtained from chlorosulfonated polyethylene alone by using tribasic lead maleate, if post-chlorinated isotactic polypropylene is incorporated within the range of 5-50 parts by weight.

However, the incorporating amount exceeding 50 parts by weight leads to drawbacks in that the physical properties inherent to chlorosulfonated polyethylene are deteriorated, i.e. resilience of the resulting coating film is degraded and the coating film tends to be hardened after weathering.

The vulcanized coating films obtained by using organic amine and epoxy resin vulcanizers had very sticky surfaces and, particularly when organic amine was used, gelation of the coating composition occurred in 20 minutes after the preparation showing the instability.

EXAMPLE 7

The various coating compositions shown in the Table 1 given in Example 1 were uniformly applied, respectively, to a plain weave cloth woven of nylon of 840 denier with 36/in. warps and 27/in. wefts so that the amount of solid deposited may be about 150 g./m.$^2$. The resulting coated cloth was dried at 100° C. for 5 minutes and heat treated at 160° C. for 10 minutes to obtain a coated cloth having a sufficiently vulcanized coating film.

The resulting various coated cloths were subjected to a rubbing test using Scott-type rubbing tester and resiliences of the vulcanized coating films were evaluated by measuring water resistances under normal and wet conditions, respectively.

There was prepared an adhesive composition by mixing 100 parts by weight of Hypalon 20 (trade name), 20 parts by weight of tribasic lead maleate, 2 parts by weight of stearic acid and 2 parts by weight of 2-mercaptoimidazoline and the resulting mixture was uniformly dispersed in toluene so that the solid concentration in the dispersion was made about 20%.

The adhesive composition thus prepared was applied on surfaces of various coated cloths referred to above according to film casting method by knife to form a coating layer of 0.3 mm. thickness thereon, respectively, and thus adhesive-applied coated cloths were allowed to stand for 5 days.

Then, there were sampled from respective coated cloths test pieces having a peeling length of 5 cm. with which an adhesive strength between the vulcanized coating film and overlaid adhesive layer was measured by using Instron type tensile tester for determining the peeling strength, respectively.

A paint was prepared by adding a pigment to the adhesive composition prepared above and uniformly mixing the ingredients in a roller mixer. The paint thus prepared was applied on surfaces of various coated cloths referred to above according to film casting method by knife to form a paint layer of 0.2 mm. thickness thereon, respectively, and thus painted coated cloths were allowed to stand for 5 days. After that, these painted coated cloths were subjected to a rubbing test using Scott-type rubbing tester to examine peeling off and damage of the paint layers.

The results of these tests mentioned above are tabulated in the following Table 2.

TABLE 2

| Coating compositions | Comparative experiments | | | | | Examples | | | | | |
|---|---|---|---|---|---|---|---|---|---|---|---|
| | 1 | 2 | 3 | 4 | 5 | 1 | 2 | 3 | 4 | 5 | 6 |
| Tests: | | | | | | | | | | | |
| Water resistance after rubbing test (m./m.):[1] | | | | | | | | | | | |
| Normal | 1,300 | 1,350 | 280 | 550 | 430 | 1,320 | 1,300 | 1,280 | 1,200 | 1,200 | 850 |
| Wet | 1,200 | 1,200 | 850 | 720 | 400 | 1,250 | 1,180 | 1,200 | 1,190 | 1,180 | 900 |
| Peeling strength (kg./2.5 cm. width) | 0.2 | 0.2 | 1.5 | 2.2 | 2.5 | 4.5 | 6.8 | 7.2 | 7.0 | 6.9 | 6.5 |
| Condition of paint layer after rubbing test [2] | ([3]) | ([3]) | Slightly damaged | | | No change | | | | | |

[1] After rubbing test was performed using Scott type rubbing tester with a load of 1 kg. for 1,000 times, the water resistance was measured according to JIS L-1031 using Shopper type waterproofing tester. In "normal" condition, the test pieces were allowed to stand at room temperature and in "wet" condition, they were immersed in water for 3 days after rubbing test.
[2] Conditions of the paint layers were examined after performing rubbing test using Scott type rubbing tester with a load of 1 kg. for 500 times.
[3] Badly peeled off and damaged.

As can be clearly noted from Table 2, although coated cloths prepared by using chlorosulfonated polyethylene and tribasic lead maleate vulcanizer show superior water resistances over other coated cloths prepared by using other types of vulcanizers, they also have a drawback in that their adhesiveness with adhesives and paints are poor.

However, it will be readily noted therefrom that in those coated cloths prepared by using the coating compositions containing 5-50 parts by weight of post-chlorinated isotactic polypropylene the adhesiveness between the vulcanized coating film and overlaid adhesive and paint layers, which is a drawback appertaining to conventional vulcanized coating films known heretofore, have been remarkably improved, while preserving the desirable physical properties inherent to chlorosulfonated polyethylene coating film vulcanized by tribasic lead maleate.

There were obtained similar satisfactory results when the coating composition of this invention was applied to other substrates such as wood or metals.

We claim:

1. A coating composition capable of affording a coating film having an improved surface adhesive property, consisting essentially of 100 parts by weight of a vulcanizable non-crystalline chlorosulfonated polyethylene, from about 15 to about 45 parts by weight of tribasic lead maleate, and from about 5 to about 50 parts by weight of chlorinated isotactic polypropylene having a chlorine content of from about 20 to about 40 percent by weight, said chlorinated isotactic polypropylene being obtained by chlorinating an isotactic polypropylene having a molecular weight of from about 50,000 to about 200,000 and an isotacticity of from about 50 to about 90 percent.

2. A coating composition according to claim 1 containing a vulcanization accelerator selected from the group consisting of tetraethylthiuram disulfide, tetramethylthiuram disulfide, dipentamethylenethiuram tetrasulfide, 2-mercaptoimidazoline, benzothiazyl disulfide and di-orthotolylguanidine.

3. A coating composition according to claim 1, wherein the chlorosulfonated polyethylene contains from about 29 to about 35 percent by weight of chlorine.

References Cited

UNITED STATES PATENTS

| | | | |
|---|---|---|---|
| 3,415,715 | 12/1968 | Van Gorcom | 161—190 |
| 3,351,677 | 11/1967 | Barton et al. | 260—889 |
| 3,244,774 | 4/1966 | Kaupp et al. | 260—897 |

OTHER REFERENCES

Hofmann, Vulcanization and Vulcanizing Agents (textbook, pp. 267–270, 1965).

MURRAY TILLMAN, Primary Examiner

C. J. SECCURO, Assistant Examiner

U.S. Cl. X.R.

260—23h, 23XA, 27R; 117—124E, 138.5